No. 877,009. PATENTED JAN. 21, 1908.
F. M. SMITH.
WAGON BRAKE.
APPLICATION FILED OCT. 2, 1907.
3 SHEETS—SHEET 2.
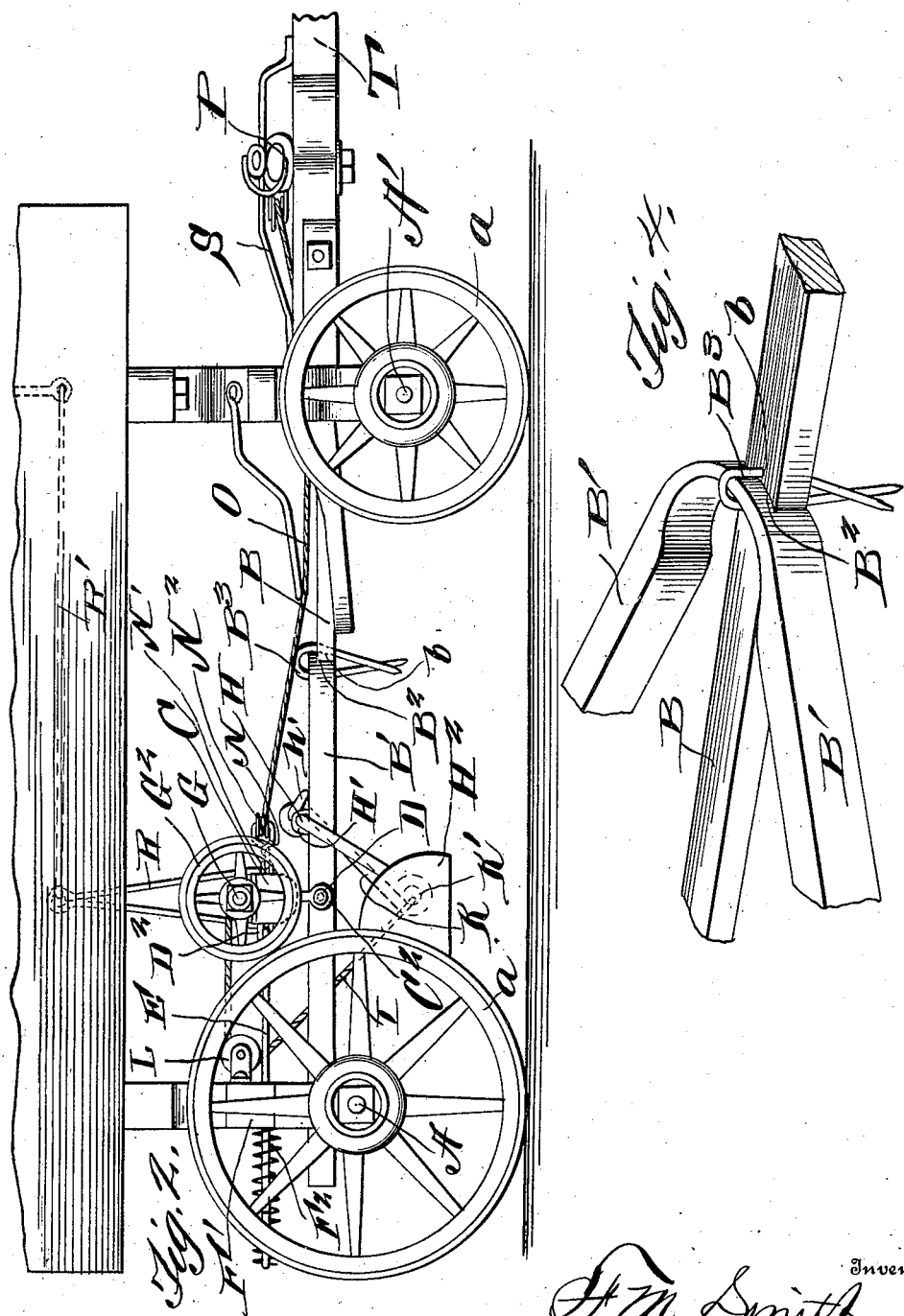

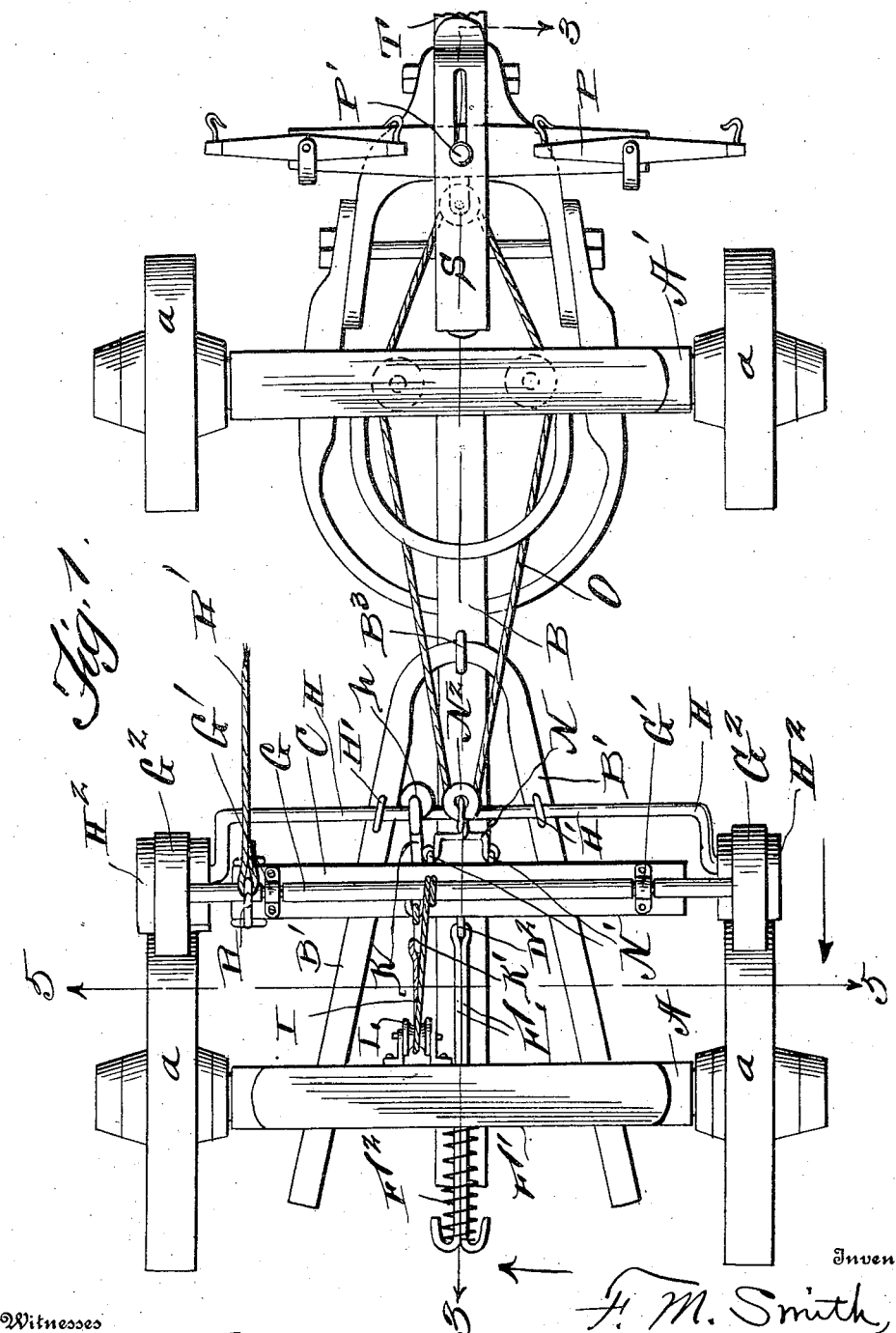

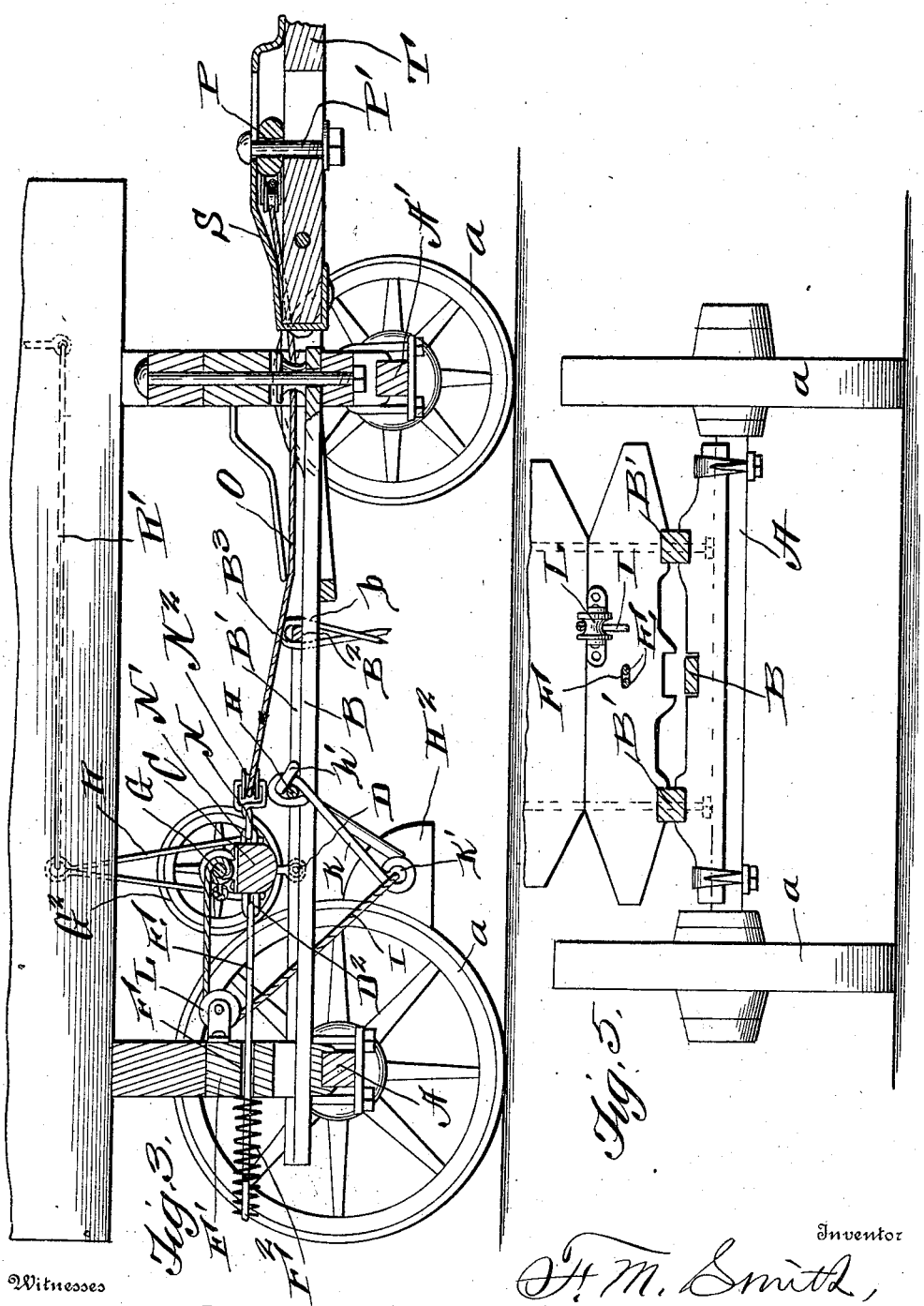

UNITED STATES PATENT OFFICE.

FRANCIS MARION SMITH, OF MARTINSVILLE, ILLINOIS.

WAGON-BRAKE.

No. 877,009.  Specification of Letters Patent.  Patented Jan. 21, 1908.

Application filed October 2, 1907. Serial No. 395,632.

*To all whom it may concern:*

Be it known that I, FRANCIS MARION SMITH, a citizen of the United States, residing at Martinsville, in the county of Clark and State of Illinois, have invented certain new and useful Improvements in Wagon-Brakes; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in automatically operated brake mechanism for vehicle wheels and the object in view is to produce a simple and efficient apparatus of this nature which will automatically lock the wheels of the vehicle when going down a grade and release the brakes when the foot of an incline is reached.

The invention comprises various details of construction and combinations and arrangements of parts which will be hereinafter fully described and then specifically defined in the appended claims.

I illustrate my invention in the accompanying drawings which form a part of this application, and in which:—

Figure 1 is a top plan view of my improved brake apparatus. Fig. 2 is a side elevation. Fig. 3 is a longitudinal sectional view. Fig. 4 is a detail view showing the manner of connecting the reach to the braces of the rear hound, and Fig. 5 is a detailed sectional view on line 5—5 of Fig. 1.

Reference now being had to the details of the drawings by letter, A and A′ designate respectively the rear and forward axles of a vehicle upon which wheels $a$ are journaled. B designates a reach which connects the axles and B′ designates a hound of the rear axle, which at its apex is provided with a recess $B^2$ adapted to receive the reach, and $B^3$ designates a staple which is passed over the contracted portion of the hound which is recessed and extends through two apertures $b$ formed in the reach, as shown clearly in the drawings. By this construction, it will be noted that the rear axle may have a slight rocking movement independent of the forward axle in order that the vehicle wheels may conform to irregularities in the roadway.

C designates a rocking beam which is recessed away upon its upper edge and rests upon the upper edge of the hound. Pins D project from said hound and eyes $C^2$ are fixed to the under edge of said beam and are pivotally connected to said pins, thereby allowing the beam to have a rocking movement resting upon the rear reach. $D^2$ designates an eye which is fastened to the central portion of said beam and E designates a rod which is bent upon itself and engages said eye $D^2$ and extends through an aperture F formed in the bolster F′ which is supported over the rear axle. The ends of said rod F are bent to form hooks and are adapted to retain a coiled spring $F^2$ which is mounted in the arms of said rod F and bears between the hooks and the rear face of the bolster, the purpose of said spring being to normally hold the rocking beam C at its farthest rearward limit. G designates a shaft which is mounted in suitable bearings G′ upon the upper edge of said beam and $G^2$ designates frictional rollers fixed one to each end of the shaft G and adapted to be normally held by said spring in contact with the rear wheels of the vehicle.

H designates a brake shaft which is adapted to have a rocking movement and is mounted in the eyes H′ upon the rear hound and $H^2$ designates brake shoes, one being mounted upon each angled end of the shaft H. Said brake shaft H is bent preferably at its longitudinal center or adjacent thereto to form an eye $h'$ and K designates a link which is connected to said eye $h'$ and its rear end is turned into an eye K′ to which a chain or cable I is fastened. L designates a roller journaled upon the rear bolster and over which the said chain or cable passes and is fastened to and adapted to wind upon the shaft G, which acts as a reel to cause the brake shoes to be drawn against the rear wheels of the vehicle when the latter is moving forward. N designates a bail-shaped rod, the ends of which are pivotally connected to the eyes N′ upon said rocking beam and $N^2$ designates a pulley journaled in a loop formed in said rod N. O designates an endless cable or chain which passes about said pulley $N^2$, thence extends between the bolster upon the forward axle and the latter, suitable rollers being provided upon the forward axle against which said cable O is adapted to bear and the forward portion of the cable or chain O is connected to an evener P, to which the whiffle trees are adapted to be connected. A pin P' is passed through the evener and also through a bar S which is fastened to the pole T and also through an elongated slot in the latter. A lever R is fixed at its lower end to said rocking beam and a rope or cord R' is fastened to said lever and forms means whereby an operator pulling upon said rope R' may cause the beam to rock and throw the friction rollers upon the shaft G out of contact with the rear wheels of the vehicle.

In operation, when the vehicle is under draft and a team pulling upon the evener, the friction rollers are held out of contact from the rear wheels of the vehicle and the spring $F^2$ under tension, by the connections shown and described. When the vehicle is going down a grade and there is no draft upon the evener, said spring will have a tendency to throw the rocking beam C back to its normal position and cause the friction rollers carried by the shaft upon said beam, to contact one against each rear vehicle wheel, causing said shaft which carries the friction rollers to rotate and act as a reel and cause the rope connected thereto to wind thereon. As said rope winds upon the shaft G, the link K, which is connected to said rope, will cause the said brake shaft to rock and the shoes thereof to frictionally engage the rear wheels of the vehicle thereby braking the same. When the vehicle reaches the bottom of the incline and draft is applied to the evener, the rock shaft will be thrown toward the front axle and, the friction wheels being free from the rear vehicle wheels, the rope will unwind from the shaft G and the brake will be thrown off said rear wheel. Should it be desired to back the vehicle when the friction rollers are in engagement with the rear wheels of the vehicle, the beam C may be rocked forward by pulling upon the rope connected to the lever, thereby allowing the vehicle to be backed without applying the brakes.

From the foregoing, it will be noted that, by the provision of the apparatus shown and described an automatically operated brake mechanism is afforded which may be readily applied and released and, by the construction of the apparatus, each axle may have a movement independent of the other, whereby the wheels may conform to irregularities in the roadway.

What I claim to be new is:—

1. An automatic brake apparatus for vehicle wheels comprising, in combination with the two axles of the running gear, wheels journaled upon said axles, a pole connected to the forward axle, an evener mounted upon said pole adapted to have a sliding movement, a rocking beam pivotally mounted upon the rear hound of the running gear, a reel beam journaled upon said rocking beam, friction rollers fixed one to each end of said reel shaft and adapted to contact with the rear wheels of the vehicle, a brake shaft journaled upon the rear hound of the gear, a pulley fixed to the rear bolster, a chain adapted to wind about the reel shaft, passing about said pulley and fastened to the brake shaft, and shoes upon the latter, a spring for normally holding said beam at its farthest rearward limit, as set forth.

2. An automatic brake apparatus for vehicle wheels comprising, in combination with the two axles of the running gear, wheels journaled upon said axles, a pole connected to the forward axle, an evener mounted upon said pole adapted to have a sliding movement, a rocking beam pivotally mounted upon the rear hound of the running gear, a reel shaft journaled upon said rocking beam, friction rollers fixed one to each end of said reel shaft and adapted to contact with the rear wheels of the vehicle, a brake shaft journaled upon the rear hound of the gear, a pulley fixed to the rear bolster, a chain adapted to wind about the reel shaft, passing about said pulley and fastened to the brake shaft, shoes upon the latter, a spring for normally holding said beam at its farthest rearward limit, a lever connected to said rocking beam, affording means for rocking the latter, as set forth.

3. An automatic brake apparatus for vehicle wheels comprising, in combination with the two axles of the running gear, wheels journaled upon said axles, a pole connected to the forward axle, an evener mounted upon said pole adapted to have a sliding movement, a spring-actuated rocking beam, eyes upon said beam, pins projecting from the rear hound of the running gear and upon which said eyes are pivotally mounted, a reel shaft journaled upon said rocking beam, frictional rollers fixed to said shaft and adapted to contact with the rear wheels of the vehicle, a brake shaft mounted in suitable bearings upon the rear hound, a link projecting from said brake shaft, a cable fastened to and adapted to wind upon said reel shaft, an anti-friction pulley upon the rear bolster over which said cable passes, the latter fastened to said link, and connections between the rocking beam and said evener, as set forth.

4. An automatic brake apparatus for vehicle wheels comprising, in combination with the two axles of the running gear, wheels journaled upon said axles, a pole connected to the forward axle, an evener mounted upon said pole adapted to have a sliding movement, a spring-actuated rocking beam, eyes upon said beam, pins projecting from the rear hound of the running gear and upon which said eyes are pivotally mounted, a reel shaft journaled upon said rocking beam, frictional rollers fixed to said shaft and adapted to contact with the rear wheels of the vehicle, a rock shaft mounted in suitable bearings upon the rear hound, a link projecting from said brake shaft, a cable fastened to and adapted to wind upon said reel shaft, an anti-friction pulley upon the rear bolster over which said cable passes, the latter fastened to said link, a bail-shaped member pivotally connected to said rocking beam, a pulley journaled upon a loop of said member, an endless chain passing about said pulley upon the bail-shaped member, and connected to the evener, as set forth.

5. An automatic brake apparatus for vehicle wheels comprising, in combination with the two axles of the running gear, wheels journaled upon said axles, a pole connected to the forward axle, an evener mounted upon said pole adapted to have a sliding movement, a rocking beam pivotally mounted upon the rear hound of the running gear, a rod connected to said beam passing through the rear bolster, the ends of said rod being bent to form hooks, a coiled spring interposed between the hooked ends of said rod and the rear face of the rear bolster and tending to normally hold the rocking beam at its farthest rearward limit, a reel shaft journaled upon said beam, friction rollers fixed to said shaft and adapted to be held by said spring in contact with the rear vehicle wheels, a brake shaft journaled upon the rear hound, shoes upon said brake shaft, a link connected to the latter, a chain fastened to and adapted to wind upon the reel shaft, a pulley upon the rear bolster over which said chain passes, said chain fastened to said link, and connections between said rocking beam and the evener, as set forth.

In testimony whereof I hereunto affix my signature in the presence of two witnesses.

FRANCIS MARION SMITH.

Witnesses:
CHESTER BARTHOLOMEW,
FORREST SMITH.